H. A. SEYMOUR.
Thermostat.
No. 27,336.
Patented Feb. 28, 1860.
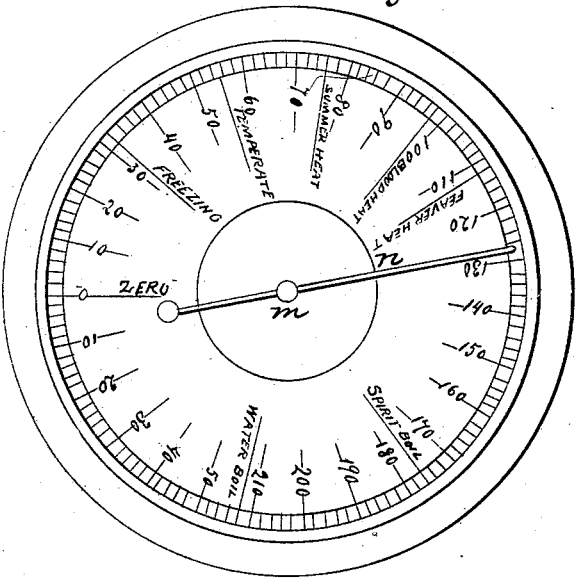
Fig. 1
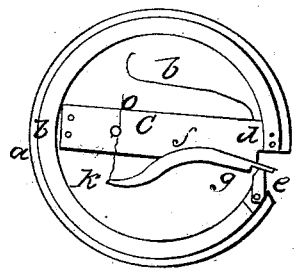
Fig. 2
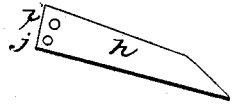
Witnesses
Henry A. Mitchell
Amos M. Johnson
Inventor
Henry A. Seymour

UNITED STATES PATENT OFFICE.

HENRY A. SEYMOUR, OF BRISTOL, CONNECTICUT, ASSIGNOR TO F. E. DARROW AND WM. WEBSTER, OF SAME PLACE.

THERMOSTAT.

Specification of Letters Patent No. 27,336, dated February 28, 1860.

*To all whom it may concern:*

Be it known that I, H. A. SEYMOUR, of Bristol, county of Hartford, and State of Connecticut, have invented certain new and useful Improvements in Thermostats; and I do hereby declare that the same is described and represented in the following specification and drawings; and to enable others skilled in the art to make and use the same I will proceed to describe its construction and operation, referring to the drawings, in which the same letters indicate like parts in each of the figures.

The nature of this improvement relates to the mode employed to regulate or nicely adjust the action of the lever and spring upon the indicating pointer, produced by the expansion and contraction of a ring shaped metallic bar composed of two different compositions, secured together, the ring being cut, and one end firmly secured, and the other end free to act, or to be acted upon, by the atmosphere to which it is exposed, causing a pointer to indicate upon a dial the variations of the temperature, or degree of heat.

In the accompanying drawings, Figure 1 shows a dial plate with a pointer to indicate the temperature, or degree of heat. Fig. 2 shows a ring shaped bar as heretofore made and used.

$a$, and $b$ show the two pieces of metal of different composition, secured together and forming a bar in the shape of a ring. One end of said ring is secured to a plate $c$, at $d$. Said plate $c$ (with its attachments) is secured to the back of the dial plate $m$, in such a manner as to bring the pivot end of the spindle $k$, (on which the pointer $n$, is secured) into the center of the said dial plate, $m$. Upon the other end of said ring is secured a button $e$, the object of which is to nicely adjust the action of the metallic ring shaped bar $a$, $b$, in its connection with the short end of the lever $f$. Said lever $f$, being hung on a pivoted stud $g$, and having its bearings in the plate $c$, and cap $h$, (said cap $h$, is laid off to show the lever, &c.) which, when in its place, is secured by screw $i$, and pin $j$, to the plate $c$, forming an opening between said cap $h$, and plate $c$, between which the lever $f$, operates on its fulcrum stud $g$.

$k$, is a stud pin, or spindle, pivoted, and having its bearings in the plate $c$, and cap $h$. Through the said stud pin, or spindle (between the plate $c$, and cap $h$,) is made a hole, or some other suitable way of fastening a connection from the long end of the lever $f$, in or to, and around the stud pin $k$, and to the end of the tension spring $l$, one end of said tension spring being secured in the plate $c$. One of the pivots on the end of the stud pin or spindle $k$, passes through the dial plate $m$, (Fig. 1,) and the indicating pointer $n$, secured thereon.

Now it will be seen that when the point of the button $e$, is rightly adjusted to, the lever $f$ and at the proper distance from the fulcrum pin, or stud $g$, and the connections $o$, made from the long end of the lever to and around the stud or spindle $k$, to the end of the spring $l$, and all the parts rightly adjusted, the pointer will indicate the degree of heat or the minute differences of temperature in or by which it is affected.

I believe I have thus described the construction and operation of my improvement, and its cheapness and simplicity at once decide its superiority, and advantage over others now in use.

What I claim, therefore, and desire to secure by Letters Patent is—

1. Forming a connection from the long end of the lever $f$, to and around the pointer spindle $k$, to the end of the tension spring $l$, substantially in the manner as and for the purpose described.

2. I claim the employment of the button $e$, upon the end of the ring shaped metallic bar $a$, $b$, to nicely adjust the action of the said bar upon the pointer $n$, through the lever $f$, connection $o$, spindle $k$, and spring $l$, arranged and operating substantially as described.

In testimony whereof I have hereunto set my hand and affixed my seal this 27th day of January, 1860.

HENRY A. SEYMOUR. [L. S.]

Witnesses:
 AMOS M. JOHNSON,
 HENRY A. MITCHELL.